(12) United States Patent
Zhang et al.

(10) Patent No.: US 10,348,025 B2
(45) Date of Patent: Jul. 9, 2019

(54) LOCKABLE STORAGE DEVICE

(71) Applicants: HONGFUJIN PRECISION ELECTRONICS (ZHENGZHOU) CO., LTD., Zhengzhou (CN); HON HAI PRECISION INDUSTRY CO., LTD., New Taipei (TW)

(72) Inventors: Xiao-Qing Zhang, Zhengzhou (CN); Ji-Xiang Yin, Zhengzhou (CN); Jiang-Feng Shan, Zhengzhou (CN); Tsung-Jen Chuang, New Taipei (TW)

(73) Assignees: HONGFUJIN PRECISION ELECTRONICS (ZHENGZHOU) CO., LTD., Zhengzhou (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/830,007

(22) Filed: Dec. 4, 2017

(65) Prior Publication Data

US 2018/0191098 A1 Jul. 5, 2018

(30) Foreign Application Priority Data

Dec. 30, 2016 (CN) .......................... 2016 1 1260116

(51) Int. Cl.
| | |
|---|---|
| *E05B 73/00* | (2006.01) |
| *G06F 21/74* | (2013.01) |
| *H01R 24/62* | (2011.01) |
| *H01R 13/447* | (2006.01) |
| *G06F 21/79* | (2013.01) |

(52) U.S. Cl.
CPC ........... *H01R 13/447* (2013.01); *E05B 73/00* (2013.01); *G06F 21/74* (2013.01); *G06F 21/79* (2013.01); *H01R 24/62* (2013.01)

(58) Field of Classification Search
CPC .. H01R 13/44; H01R 13/447; H01R 13/4534; H01R 13/4538; H01R 13/6397; E05B 73/00; E05B 37/02
USPC ....... 439/133, 135, 136, 139, 140; 70/57, 58
See application file for complete search history.

(56) References Cited

U.S. PATENT DOCUMENTS

| | | | | |
|---|---|---|---|---|
| 4,646,547 | A * | 3/1987 | Scelba ................ | E05B 15/1621 70/312 |
| 6,058,744 | A * | 5/2000 | Ling ..................... | E05B 37/025 70/28 |
| 7,581,417 | B1 * | 9/2009 | Chen ..................... | E05B 37/025 439/133 |
| 7,677,065 | B1 * | 3/2010 | Miao ....................... | E05B 37/02 439/133 |

(Continued)

*Primary Examiner* — Edwin A. Leon
*Assistant Examiner* — Oscar C Jimenez
(74) *Attorney, Agent, or Firm* — ScienBiziP, P.C.

(57) ABSTRACT

A lockable storage device includes a main body defining a connector; and a locking mechanism including a stopping member and a driving plate assembly. The connector defines a receiving space for receiving a port, the stopping member is movable in the receiving space. The driving plate assembly includes a number of driving plates marked with numbers. When a combination of numbers, formed by surfaces which are on a same plane, is different from a predetermined number sequence, the storage device is locked, when the combination of numbers formed by the surfaces is the same as the predetermined number sequence, the storage device is unlocked.

11 Claims, 4 Drawing Sheets

(56) References Cited

U.S. PATENT DOCUMENTS

| | | | | |
|---|---|---|---|---|
| 8,671,721 B2* | 3/2014 | Yu | ............................ | E05B 37/025 |
| | | | | 70/14 |
| 2007/0277566 A1* | 12/2007 | Yu | ......................... | E05B 73/0005 |
| | | | | 70/58 |
| 2009/0042433 A1* | 2/2009 | Bushby | ............... | H01R 13/4538 |
| | | | | 439/352 |
| 2010/0031710 A1* | 2/2010 | Chen | ........................ | E05B 37/02 |
| | | | | 70/57 |
| 2014/0130555 A1* | 5/2014 | Clark | ..................... | E05B 35/008 |
| | | | | 70/58 |
| 2017/0110831 A1* | 4/2017 | Su | ......................... | H01R 13/639 |

* cited by examiner

LOCKABLE STORAGE DEVICE

CROSS-REFERENCE TO RELATED APPLICATIONS

This application claims priority to Chinese Patent Application No. 201611260116.4 filed on Dec. 30, 2016, the contents of which are incorporated by reference herein.

FIELD

The subject matter herein generally relates to data security, and particularly to a lockable storage device.

BACKGROUND

Portable storage devices, such as USB flash disks and mobile hard disks, are widely used. The portable storage devices are usually used to plug and play, and lack security structure to limit unauthorized uses. Thus, data in the portable storage device is easily stolen.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
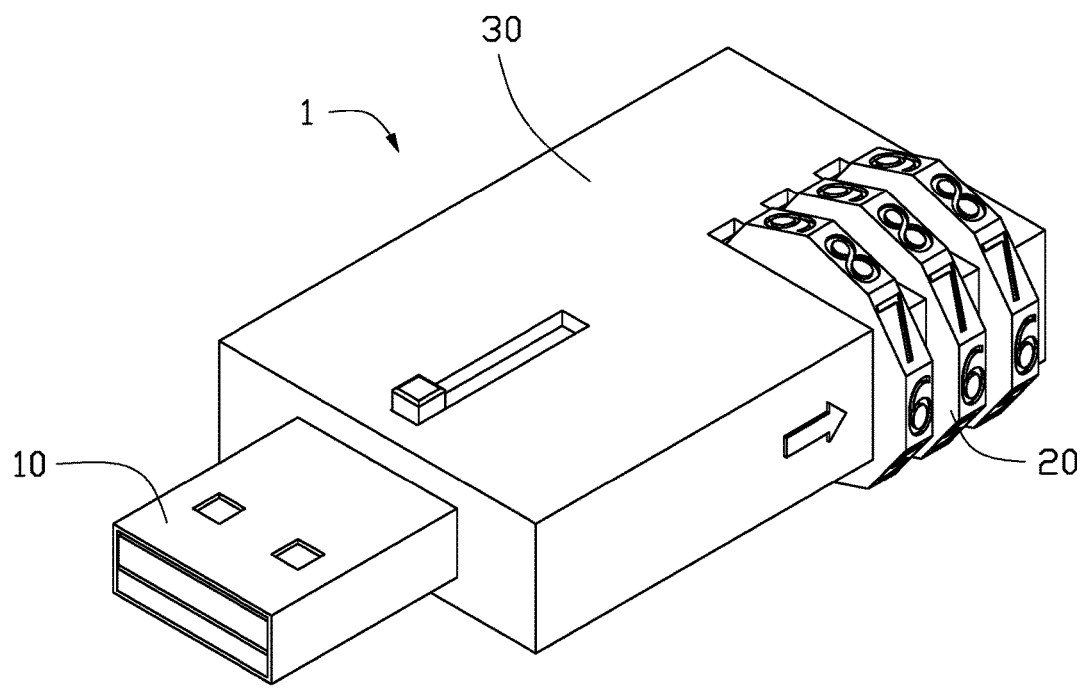
FIG. 1 is a schematic view illustrating an exemplary embodiment of a storage device.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts have been exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" exemplary embodiment in this disclosure are not necessarily to the same exemplary embodiment, and such references mean "at least one".

The term "comprising" means "including, but not necessarily limited to", it specifically indicates open-ended inclusion or membership in a so-described combination, group, series, and the like.

FIG. 1 illustrates an exemplary embodiment of a lockable storage device 1. The storage device 1 includes a main body 10, a locking mechanism 20, and a casing 30. In at least one exemplary embodiment, the storage device 1 can be a USB flash disk or a mobile hard disk.

Figure 2:
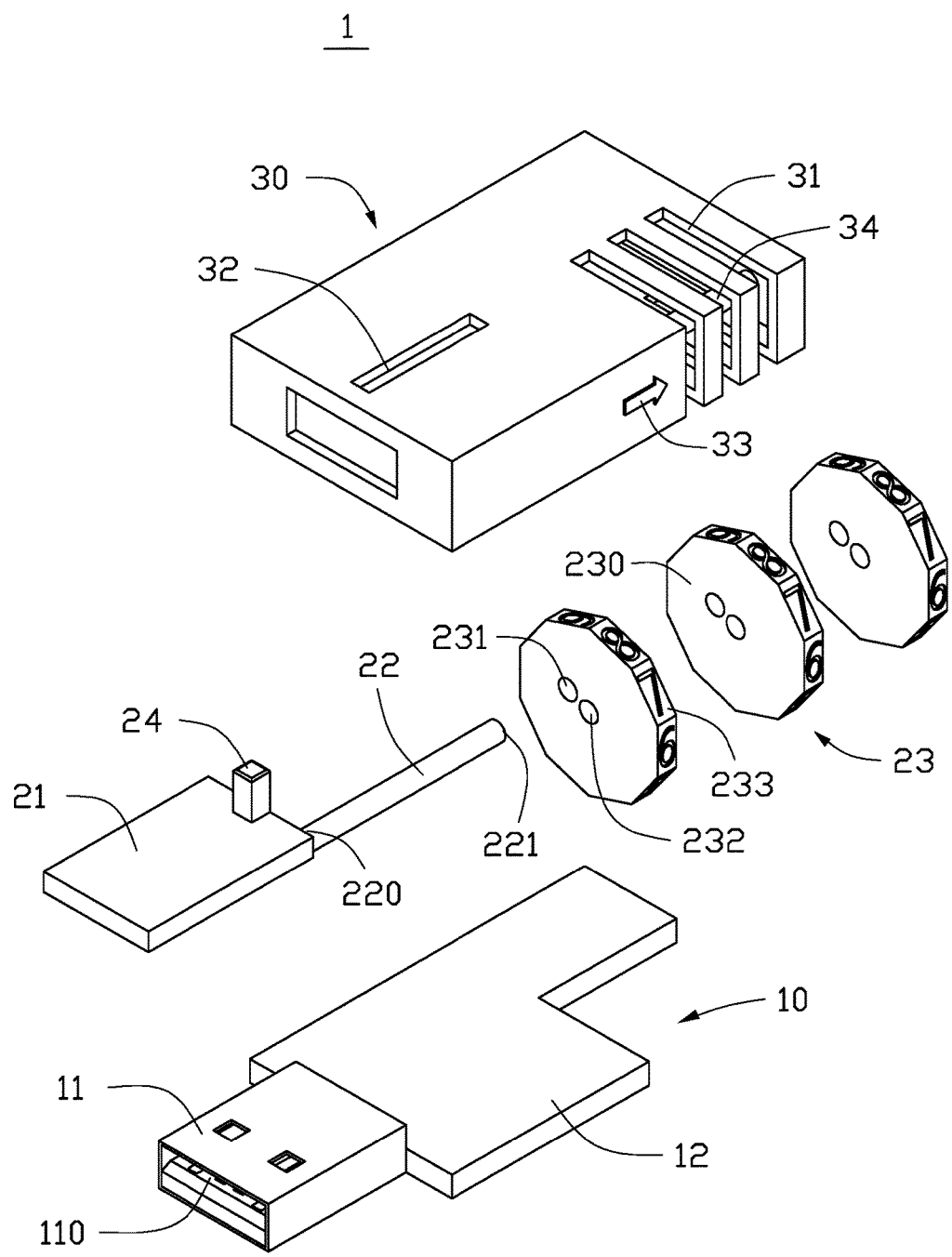
FIG. 2 is an exploded view of the storage device of FIG. 1.

Referring to FIG. 2, the main body 10 includes a connector 11 and a circuit board 12. The connector 11 defines a receiving space 110, the receiving space 110 is used for receiving a port (not shown). The port is arranged on an electronic device, such as a computer. The connector 11 defines a number of metal contactors (not shown). When the connector 11 is connected to a port, the metal contactors in the receiving space 110 electrically couple to the port, and the storage device 1 is thus connected to the electronic device having the port. In at least one exemplary embodiment, the connector 11 can be a USB connector, the port can be a USB port.

The circuit board 12 is electrically coupled to the connector 11. The circuit board 12 is integrated with processors and storage chips, which are used for performing a data transmitting function and a data receiving function of the storage device 1.

As illustrated in FIG. 2, the locking mechanism 20 includes a stopping member 21, a connection member 22, a driving plate assembly 23, and an operation member 24. The stopping member 21 is slidably arranged in the receiving space 110 of the connector 11. The connection member 22 is rod-shaped, and includes a first end 220 and a second end 221. The first end 220 is mounted on the stopping member 21. The second end 221 is contacted with the driving plate assembly 23.

The driving plate assembly 23 includes a number of driving plates 230. Each driving plate 230 defines a through hole 231 and an axle hole 232. The axle hole 232 is located on a central position of the driving plate 230. The through hole 231 is located near the axle hole 232. The operation member 24 is mounted on an upper surface of the stopping member 21. The operation member 24 is used for driving the stopping member 21 to slide in the receiving space 110, when the operation member 24 is operated by a user.

Figure 3:
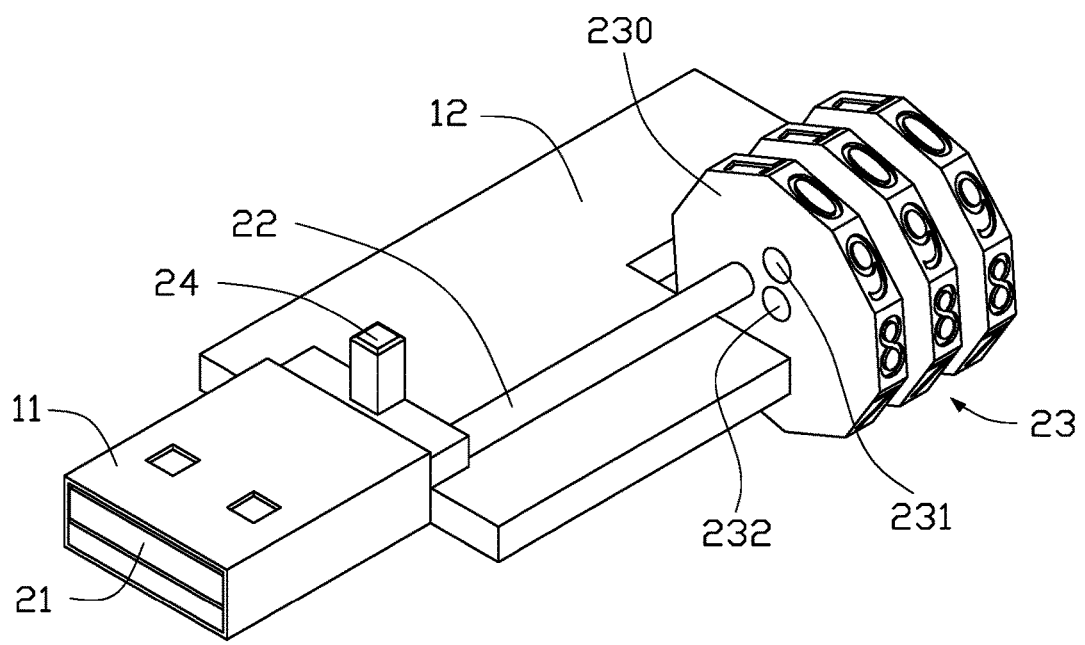
FIG. 3 is a schematic view illustrating the storage device of FIG. 1 in a locked state.

Referring to FIG. 3, when the storage device 1 is in a locked state, the connection member 22 is contacted with a surface of the left driving plate 230, the stopping member 21 is entirely received in the receiving space 110, thus preventing the connector 11 from being connected to the port.

Figure 4:
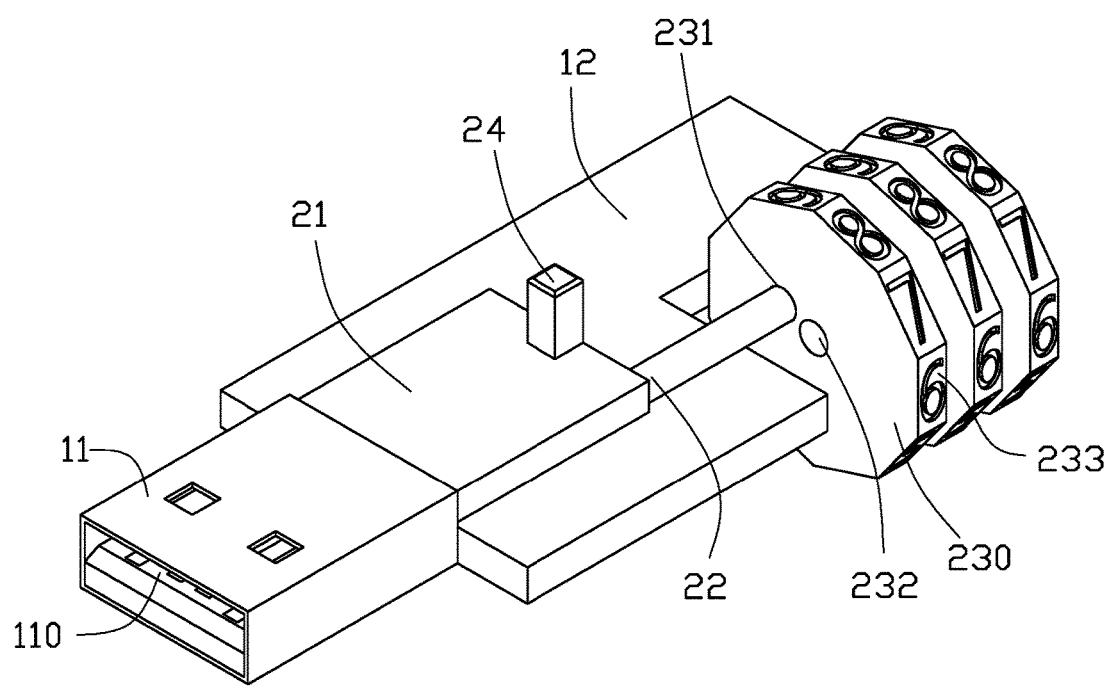
FIG. 4 is a schematic view illustrating the storage device of FIG. 1 in an unlocked state.

Referring to FIG. 4, when the driving plate assembly 23 is revolved to a certain position until the through hole 231 of each driving plate 230 faces to the connection member 22, the operation member 24 can be operated to drive the stopping member 21 to slide towards the driving plate assembly 23. When the stopping member 21 is no longer received in the receiving space 110, the storage device 1 is unlocked and can be coupled to a port.

As illustrated in FIGS. 1-2, in at least one exemplary embodiment, the casing 30 covers the circuit board 12. The connector 11 is exposed out of the casing 30. The casing 30 defines a number of through grooves 31, a sliding groove 32, and a scale line 33. The through grooves 31 are arranged on a side of the casing 30, the number of the through grooves 31 is the same as the number of the driving plates 230, each through groove 31 receives a driving plate 230.

A position of the sliding groove 32 corresponds to the operation member 24. In at least one exemplary embodiment, the sliding groove 32 is arranged on the upper surface of the casing 30, the sliding groove 32 is used for receiving the operation member 24. The operation member 24 is exposed out of the sliding groove 32, and can slide in the sliding groove 32. When the operation member 24 is driven to slide in the sliding groove 32, the operation member 24 further drives the stopping member 21 to slide in the receiving space 110.

The scale line 33 is arranged on a side surface of the casing 30, the scale line 33 is a convenient marker for the user to revolve each driving plate 230 of the driving plate assembly 23 to a designated position, and unlock the storage device 1. The casing 30 further defines a connection shaft 34 in the position of the through grooves 31. The connection shaft 34 passes through each of the axle holes 232 of the driving plates 230, thus the driving plate assembly 23 is mounted in the through grooves 31, and each driving plate 230 can rotate about the connection shaft 34.

In at least one exemplary embodiment, the driving plate 230 includes a number of surfaces 233, the number of surfaces 233 have a same size, and each surface 233 is marked with a number. In at least one exemplary embodiment, the driving plate assembly 23 includes three driving plates 230, each of the driving plates 230 includes ten surfaces 233, each surface 233 is marked with one number, from 0-9. In other exemplary embodiments, the quantity of the driving plates 230 and the surfaces 233 can be any other suitable values.

As illustrated in FIG. 1 and FIG. 3, in at least one exemplary embodiment, when a combination of numbers formed by the surfaces 233 which are aligned to the scale line 33 is different from a predetermined number sequence, the storage device 1 is locked. At this time, the operation member 24 is located on an end of the sliding groove 32 close to the connector 11, the connection member 22 is contacted with the driving plate 230, the stopping member 21 is entirely received in the receiving space 110. The receiving space 110 is blocked by the stopping member 21, thus the connector 11 cannot be connected to the port.

As illustrated in FIG. 4, when the user unlocks the storage device 1, the user revolves each driving plate 230 until the combination of numbers formed by the surfaces 233 which are aligned to the scale line 33 is the same as the predetermined number sequence. That is, when the surfaces 233 which the numbers are located on and the scale line 33 are on a same plane, and the combination of numbers is the same as the predetermined number sequence, the through hole 231 of each driving plate 230 aligns to the connection member 22. In at least one exemplary embodiment, when unlocking the storage device 1, a number of groups of numbers may be equal to the predetermined number sequence, but the scale line 33 can restrict one group of numbers to being the unlocking sequence.

For example, the predetermined number sequence is assumed as 820. The user revolves the driving plate 230 close to the scale line 33 until the number 8 aligns to the scale line 33, revolves the middle driving plate 230 until the number 2 aligns to the scale line 33, and revolves the driving plate 230 away from the scale line 33 until the number 0 aligns to the scale line 33. At this time, the driving plate assembly 23 is in an unlocked state, the through hole 231 of each driving plate 230 aligns to the connection member 22.

When the driving plate assembly 23 is in the unlocked state, the user can drive the operation member 24 to slide in the sliding groove 32, then the operation member 24 drives the stopping member 21 to slide towards the driving plate assembly 23, and the connection member 22 is driven to move in the through holes 231 of the driving plates 230. When the operation member 24 slides to an end of the sliding groove 32 away from the connector 11, the stopping member 21 is no longer received in the receiving space 110. At this time, the storage device 1 is unlocked, and the receiving space 110 can receive the port, thus the connector 11 can be connected to the port.

In other exemplary embodiments, the connector 11 includes at least one terminal (not shown), the terminal is used for being electrically coupled to the port. The stopping member 21 is arranged in the connector 11. When the combination of numbers formed by the surfaces 233 which are aligned to the scale line 33 is different from the predetermined number sequence, the stopping member 21 is locked in the connector 11, which can prevent the terminal from being electrically coupled to the port. When the combination of numbers formed by the surfaces 233 which are aligned to the scale line 33 is the same as the predetermined number sequence, the stopping member 21 is unlocked, and can be driven to expose the terminal, thus the terminal can be electrically coupled to the port.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being exemplary embodiments of the present disclosure.

What is claimed is:

1. A lockable storage device comprising:
a main body comprising a connector; and
a locking mechanism comprising a stopping member, a driving plate assembly, and a connection member; wherein the connector defines a receiving space, the receiving space is used for receiving a port, the stopping member is slidably arranged in the receiving space, the driving plate assembly comprises a plurality of driving plates, each driving plate comprises a plurality of surfaces, and each surface is marked with a number, when a combination of numbers, formed by the surfaces which are on a same plane, is different from a predetermined number sequence, the stopping member is entirely received in the receiving space, the storage device is thus locked, when the combination of numbers formed by the surfaces which are on the same plane is the same as the predetermined number sequence, the stopping member is driven to slide towards the driving plate assembly, and no longer received in the receiving space, the storage device is thus unlocked, each driving plate of the driving plate assembly defines a through hole, when the storage device is locked, the connection member is contacted with a surface of one of the driving plates, when the storage device is unlocked, the through holes of the driving plates align to the connection member.

2. The lockable storage device according to claim 1, wherein each of the driving plates of the driving plate assembly comprises ten surfaces, each surface is marked with one of the numbers from 0-9.

3. The lockable storage device according to claim 1, wherein the connection member is rod-shaped, and comprises a first end and a second end, the first end is mounted on the stopping member, and the second end is contacted with the driving plate assembly.

4. The lockable storage device according to claim 1, further comprising:

a casing defining a plurality of though grooves, wherein the number of the through grooves is equal to the number of the driving plates, each driving plate is received in a through groove, the connector is exposed out of the casing.

5. The lockable storage device according to claim 4, wherein each driving plate of the driving plate assembly further defines an axle hole, the axle hole is located on a central position of the driving plate, the through hole is located near the axle hole.

6. The lockable storage device according to claim 5, wherein the casing further defines a connection shaft in the position of the through grooves, the connection shaft passes through each of the axle holes of the driving plates, thus the driving plate assembly is mounted in the through grooves, and each driving plate rotates about the connection shaft.

7. The lockable storage device according to claim 4, wherein the casing further defines a scale line, when the combination of numbers, formed by the surfaces which are aligned to the scale line, is different from the predetermined number sequence, the storage device is locked; when the driving plates are revolved to a position until the combination of numbers, formed by the surfaces which are aligned to the scale line, is the same as the predetermined number sequence, the through hole of each driving plate aligns to the connection member, the storage device is unlocked.

8. The lockable storage device according to claim 7, wherein the locking mechanism further comprises an operation member, the operation member is mounted on the stopping member, the operation member is used for driving the stopping member to slide in the receiving space, when the operation member is operated by a user.

9. The lockable storage device according to claim 8, wherein the casing further defines a sliding groove, the sliding groove is arranged on an upper surface of the casing, and is used for receiving the operation member, the operation member is exposed out of the sliding groove, and is driven to slide in the sliding groove.

10. The lockable storage device according to claim 1, further comprising:
a circuit board electrically coupled to the connector and integrated with processors and storage chips, wherein the processors and the storage chips are used for performing a data transmitting function and a data receiving function of the storage device.

11. A lockable storage device comprising:
a main body comprising a connector; and
a locking mechanism comprising a stopping member, a driving plate assembly, and a connection member; wherein the connector defines at least one terminal, the terminal is used for electrically being coupled to a port, the stopping member is arranged in the connector, the driving plate assembly comprises a plurality of driving plates, each driving plate comprises a plurality of surfaces, each surface is marked with a number, when a combination of numbers, formed by the surfaces which are on a same plane, is different from a predetermined number sequence, the stopping member is locked in the connector, the terminal is not coupled to the port, when the combination of numbers formed by the surfaces which are on a same plane is the same as the predetermined number sequence, the stopping member is unlocked, and is driven to expose the terminal, thus the terminal is electrically coupled to the port, each driving plate of the driving plate assembly defines a through hole, when the storage device is locked, the connection member is contacted with a surface of one of the driving plates, when the storage device is unlocked, the through holes of the driving plates align to the connection member.

\* \* \* \* \*